United States Patent [19]

Nagata et al.

[11] Patent Number: 5,390,021
[45] Date of Patent: Feb. 14, 1995

[54] OPTICAL RING RESONATOR GYRO USING COHERENT LIGHT MODULATED BY A RECTANGULAR SIGNAL HAVING ITS PERIOD DIVIDED INTO FOUR INTERVALS

[75] Inventors: Chihito Nagata; Kenichi Okada, both of Tokyo, Japan

[73] Assignee: Japan Aviation Electronics Industry Limited, Tokyo, Japan

[21] Appl. No.: 27,536

[22] Filed: Mar. 8, 1993

[51] Int. Cl.[6] .............................................. G01C 19/72
[52] U.S. Cl. ..................................................... 356/350
[58] Field of Search ........................... 356/350; 372/94

[56] References Cited

U.S. PATENT DOCUMENTS 4,661,964  4/1987  Haavisto ............................. 356/350
4,674,881  6/1987  Lawrence et al. ................... 356/350

*Primary Examiner*—Samuel A. Turner
*Attorney, Agent, or Firm*—Pollock, Vande Sande & Priddy

[57] ABSTRACT

A high level from a reference high level register and a low level from a reference low level register are selectively applied by a change-over switch to a D-A converter in time intervals A+ and B+ of four intervals A+, B+, A− and B− and in the intervals A− and B−, respectively, whereby a rectangular output signal is produced and used to control the current to be injected into a semiconductor laser to control the optical frequency of its output light. The light is introduced, as clockwise and counterclockwise light beams, into a ring-shaped optical path, wherein both light beams propagate therethrough a plurality of times and interfere with each other a plurality of times. Such light beams are taken out of the ring-shaped optical path and their intensities are detected by first and second photodetectors. In the intervals A+ and A− the outputs from the first photodetector are sample-held and the difference between their levels in the intervals A+ and A− is detected by a first subtractor, and such differences are accumulated by a first accumulator to obtain a deviation signal. Similarly, in the intervals B+ and B− the outputs from the second photodetector are sample-held and a deviation is obtained from a second accumulator. The output from the first accumulator and the output from the second accumulator are taken out by a switch in the intervals A+, A− and in the intervals B+, B−, respectively, and they are added to the rectangular output signal to control the current to be injected into the semiconductor laser.

4 Claims, 9 Drawing Sheets

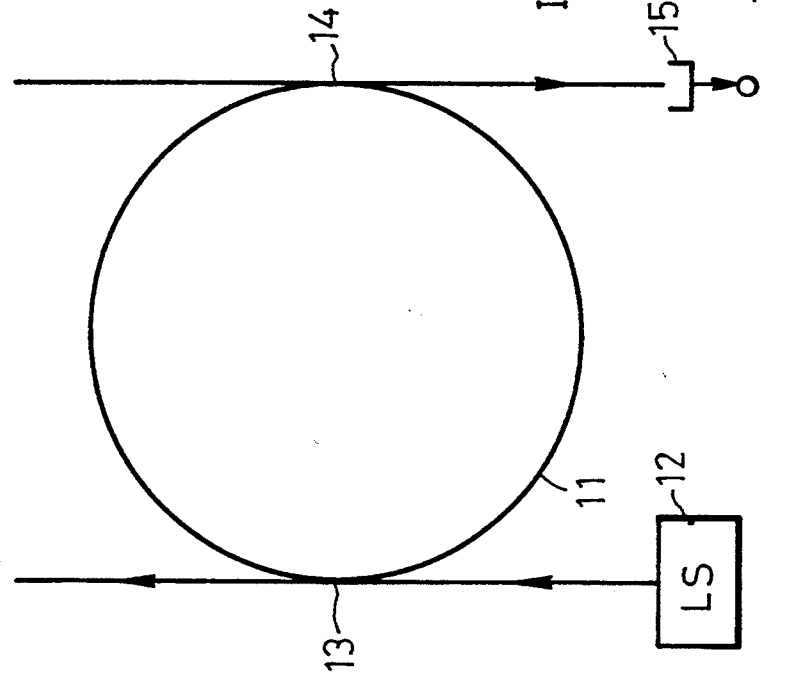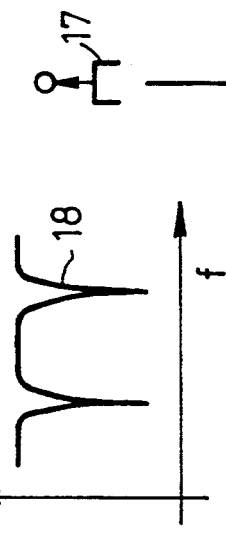

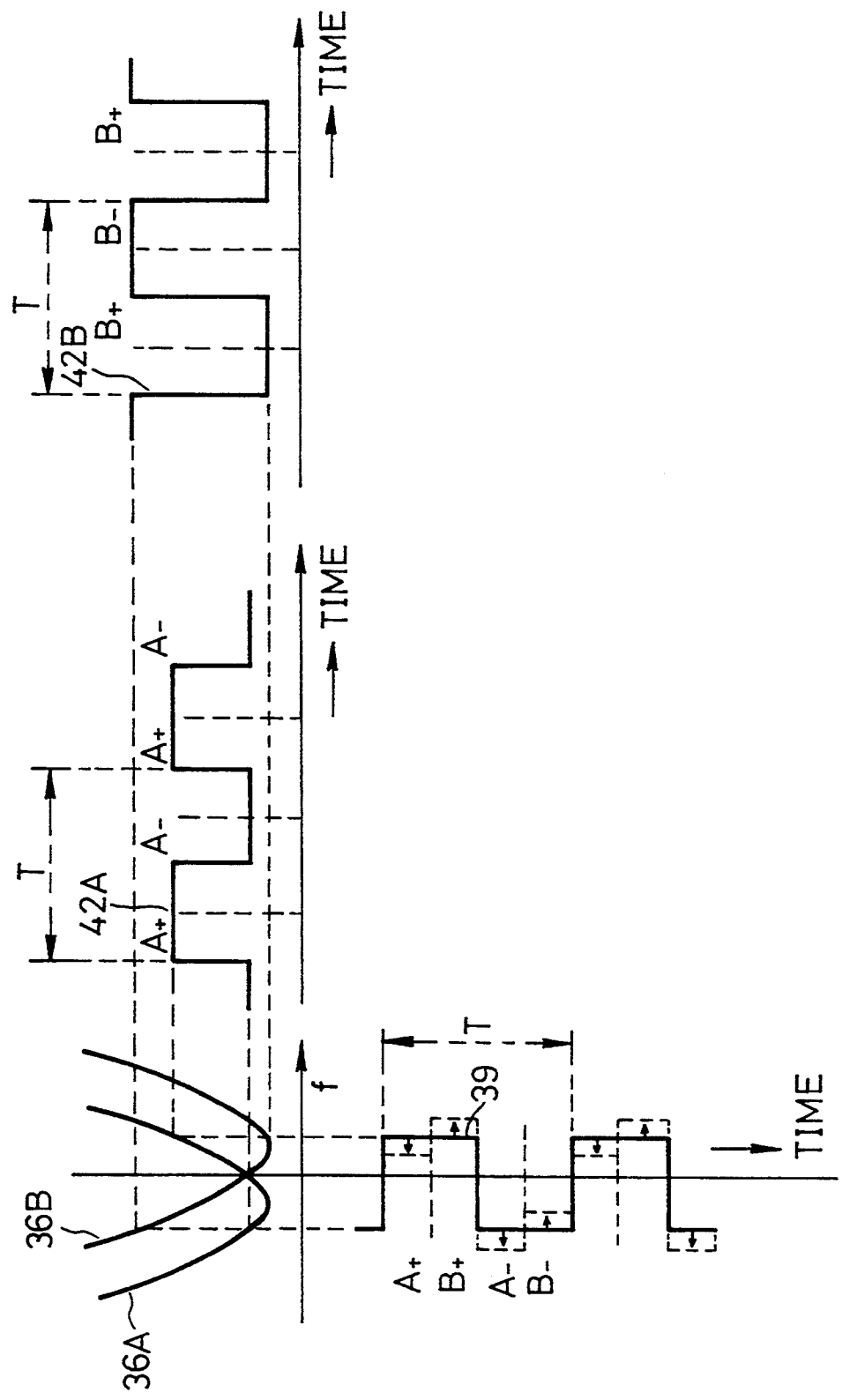

OPTICAL RING RESONATOR GYRO USING COHERENT LIGHT MODULATED BY A RECTANGULAR SIGNAL HAVING ITS PERIOD DIVIDED INTO FOUR INTERVALS

BACKGROUND OF THE INVENTION

The present invention relates generally to an optical ring resonator type gyro commonly referred to as an optical passive ring resonator gyro (OPRG) wherein coherent light is beams frequency shifted and introduced into a ring-shaped optical path so as to propagate therethrough in opposite directions to each other as clockwise and counterclockwise light beams respectively, and after the light beams have propagated through the optical path in opposite directions a plurality of times so that they undergo multiple interference with each other, a portion of each light beam is taken out of the optical path to detect the light intensity and the thus detected outputs are negatively fed back to control the frequency shifts of the clockwise and counterclockwise light beams, thereby detecting an angular rate or velocity applied to the ring-shaped optical path.

A description will be given first of an optical ring resonator. In the optical ring resonator, when the effective optical path length corresponding to the entire length of the ring is an integral multiple of the wavelength of light, the multiple interference light satisfies conditions for resonance and hence goes bright and has large energy. As shown in FIG. 1, coherent light is introduced into a ring resonator 11 via an optical directional coupler 13 from a light source 12 to propagate through the resonator 11 (clockwise, in this example), a portion of the light is taken out of the ring resonator 11 via an optical directional coupler 14 and the intensity of such light is detected by a photodetector 15. The light intensity I thus detected has a characteristic such as indicated by the curve 16 in FIG. 1A with respect to the frequency of light from the light source 12. At the frequency which satisfies the conditions for resonance the detected light intensity increases abruptly, and at this time, the interference light goes bright.

On the other hand, a portion of the light beam is taken out of the ring resonator 11 also via the optical directional coupler 13 through which the light beam is introduced into the ring resonator 11. The light beam thus taken out interferes with the incident light beam and the intensity of the interference light, detected by a photodetector 17 has a frequency characteristic such indicated by the curve 18 in FIG. 1B. At the frequency which satisfies the condition for resonance the detected light intensity decreases sharply and the interference light goes dark. The characteristics 16 and 18 obtainable with the photodetectors 15 and 17 are sometimes called the transmission characteristic and reflection characteristic of the optical ring resonator 11, respectively, and either of them, can be used to form the optical ring resonator gyro. Since the use of optical couplers in combination with the optical ring resonator usually deteriorates its characteristic, the reflection characteristic is utilized in many cases.

Now, the outline will be given of a conventional optical ring resonator gyro which utilizes the reflection characteristic. The reflection characteristic 18 is given by the following expression:

$$I = I_0 \nu \{1 - \alpha/[1 + \beta \sin^2(f\tau/2)]\}$$

where I is the output light intensity, $I_0$ the incident light intensity, $\nu$ an optical coupler loss, $\alpha$ and $\beta$ constants dependent on the optical system used, f the optical frequency, and $\tau$ the time for light to make a round of the ring of the optical ring resonator.

The principle of the optical ring resonator gyro is based on the Sagnac effect. The Sagnac effect is an effect wherein when a ring-shaped optical path surrounding a limited closed area performs an angular velocity motion about a normal to the closed area, a difference occurs in the effective propagation time between both light beams propagating in the ring-shaped optical path in opposite directions.

The effective propagation time difference $\Delta\tau$ is given by the following expression:

$$\Delta\tau = (4S/C^2)\Omega$$

where S is the closed area, C the velocity of light and $\Omega$ the angular velocity. When the ring-shaped optical path constitutes a resonator, the condition for resonance of light, given by the following expression, also differs between the two light beams owing to the Sagnac effect:

$$f_r = M/\tau$$

where $f_r$ is the light resonance frequency, $\tau$ the time for light to make a round of the ring-shaped optical path and m an integer. And the resonance frequency difference $\Delta f_r$ between the two light beams is as follows:

$$\Delta f_r = (4S/\lambda L)\Omega$$

where $\lambda$ is the wavelength of light and L the length of the ring-shaped optical path. By introducing coherent light into the optical ring resonator in opposite directions and detecting the resonance frequency difference between the two light beams at the same time, the angular rate or velocity applied to the optical ring resonator can be determined. The angular velocity sensor based on this principle is commonly referred to as an optical passive ring resonator gyro.

FIG. 2 shows in block form the construction of such a conventional optical ring resonator gyro. Light emitted from the light source 12 is split by an optical directional coupler 19 into two light beams, which are frequency modulated by optical frequency shifters 21 and 22, respectively, and the two frequency-modulated light beams are introduced by the optical directional coupler 13, as clockwise and counterclockwise light beams, into the ring-shaped optical path 11 formed by an optical waveguide as of glass or optical crystal. The oscillation output of an oscillator 23 is usually a sine-wave and the sine-wave signal is applied as a control signal to variable frequency oscillators (VCO's) 26 and 27 via adders 24 and 25, respectively, by which the oscillation frequencies of the variable frequency oscillators 26 and 27 are varied sinusoidally. The oscillation outputs from the variable frequency oscillators 26 and 27 are applied to the optical frequency shifters 21 and 22 to drive them.

A portion of both light beams, which have propagated in the ring-shaped optical path 11 a plurality of times and have undergone multiple interference with each other, is led out of the optical path 11 via the optical directional coupler 13, wherein the light beams thus led out of the optical path 11 interfere with light beams from the optical frequency shifters 21 and 22 for incidence to the optical path 11, respectively. The resulting interference light beams are provided via optical directional couplers 28 and 29 to photodetectors 31 and 32 for conversion to electrical signals. The outputs from the photodetectors 31 and 32 are applied to lock-in amplifiers 33 and 34, wherein they are synchronously detected by the output from the oscillator 23. The detected outputs are applied to the adders 24 and 25, wherein they are each added with the output from the oscillator 23, and the added outputs are provided as the control signals to the VCO's 26 and 27.

In the case where the frequency of the output light from the one optical frequency shifter 21 is frequency modulated by a sine wave from the oscillator 23 which has a period T as indicated by the curve 35 in FIG. 3A and the center frequency is made to agree with the frequency at the bottom of one fall or drop in the reflection characteristic 18 shown in FIG. 1B, the intensity of the signal that is provided from the optical directional coupler 28 to the photodetector 31 corresponding to that one fall or drop characteristic 36 varies at a frequency twice higher than the output frequency of the oscillator 23, as indicated by the curve 37. In consequence, the output from the lock-in amplifier 33 and hence the output from the synchronous detector is reduced to zero.

When an angular rate is applied to the ring-shaped optical path 11 about its axis, the resonance frequency of the ring-shaped optical path 11 is shifted by the Sagnac effect; for example, as shown in FIG. 3B, the frequency of the reflection characteristic which takes the minimum value of the fall-in characteristic 36 deviates from the center of the frequency of the output light of the optical frequency shifter 21. As a result, the signal intensity, which is provided at the output of the photodetector 31, includes the main component of the output frequency of the oscillator 23 as indicated by the curve 37. Thus the output of the lock-in amplifier 33, that is, the synchronously detected output corresponds to the input angular rate. The output from the lock-in amplifier 33 is negatively fed back to the VCO 26 via the adder 24, by which the center frequency for the optical frequency modulation by the optical frequency shifter 21 is shifted to remove the deviation from the frequency of the reflection characteristic which takes the minimum value of the fall-in characteristic 36.

Also for the light obtained by introducing the output light from the other optical frequency shifter 22 into the ring-shaped optical path 11, the same operation as described above is carried out by the photodetector 32, the lock-in amplifier 34, the adder 25 and the VCO 27. Hence the clockwise and counterclockwise light beams in the ring-shaped optical path 11 are always controlled so that the centers of their frequencies resonate in the optical path 11. The frequency difference between the outputs from the VCO's 26 and 27 is detected, as the frequency difference between the two light beams, by a double balanced mixer 38, and this difference frequency is a detected quantity indicative of the angular rate input into the ring-shaped optical path 11.

The optical frequency shifters 21 and 22 are typically acoustooptic devices which utilize the Bragg diffraction.

Incidentally, the above-described optical passive ring resonator gyro calls for two optical frequency shifters 21 and 22. The acoustooptic devices, which are actually used as optical frequency shifters, are bulky, heavy, high in light loss, large in power consumption, unstable in operation and radiate high frequency magnetic fields, which constitute a leading factor in the generation of noise. Moreover, since the modulated light beams must be transmitted through such relatively large acoustooptic devices as three-dimensional media, much difficulty is involved in the alignment of optical axes and other packaging work. Besides, electrical circuits for driving use generate much heat.

Optical frequency shift means free from the abovesaid shortcomings is what is called direct modulation in the case of using a semiconductor laser as the light source. Direct modulation utilizes a characteristic that the laser oscillation frequency deviates linearly in the operational region in accordance with the laser drive current. Since the optical passive ring resonator gyro requires independent optical frequency control means for each of the clockwise and counterclockwise light beams as referred to above, however, even if direct modulation is applied to the light source which is used for both light beams in common thereto, at least one external optical frequency shifter is needed in the case of employing the conventional method.

SUMMARY OF THE INVENTION

It is therefore an object of the present invention to provide an optical ring resonator gyro which permits the detection of the resonance frequency difference between clockwise and counterclockwise light beams by use of a single optical frequency shift means, thereby obviating the above-mentioned defects of the prior art.

According to the present invention, light frequency shifted by single optical frequency shift means is introduced, as clockwise and counterclockwise light beams, into a ring-shaped optical path via single optical coupler means and the two light beams propagate in the ring-shaped optical path a plurality of times and undergo multiple interference with each other. A portion of each light beam and the light beam frequency shifter by the optical frequency shift means are combined by the optical coupler means and interfere, with each other, and the intensities of such interference light beams are detected by first and second photodetectors. A rectangular signal from rectangular signal generator means is applied as a drive signal to the optical frequency shift means. This rectangular signal has its period divided into four intervals in which each high-level duration thereof is divided into two intervals, i.e. first and second intervals and each low-level duration thereof is divided into two intervals, i.e. third and fourth intervals. In the first and third intervals, the output of the first photodetector is detected by first deviation signal detecting means and the difference between the thus detected outputs is used as a first deviation signal. In the second and fourth intervals of the rectangular signal the output of the second photodetector is detected by second deviation signal detecting means and the difference between the thus detected outputs is used as a second deviation signal. In the first and third intervals the first deviation signal Is negatively fed back to the optical frequency shift means so that it is reduced to zero. In the second and fourth intervals the second deviation signal is negatively fed back to the optical frequency shift means so that it is reduced to zero.

It is also possible to adopt a construction in which the clockwise and counterclockwise light beams are partly taken out of the ring-shaped optical path via a port different from the light inlet port and are provided to the first and second photodetectors, respectively, and their outputs are negatively fed back to the single optical frequency shift means to control it in, the first and third intervals and in the second and fourth intervals, respectively, in the same manner as mentioned above,

BRIEF DESCRIPTION OF THE DRAWINGS

FIG. 1 is a schematic diagram for explaining a prior art optical ring resonator;

FIG. 1A is a graph showing the transmission characteristic of the resonator depicted in FIG. 1;

FIG. 1B is a graph showing the reflection characteristic of the resonator depicted in FIG. 1;

FIG. 5 is a graph showing the relationship between optical frequency changes and the intensities of clockwise and counterclockwise light beams, for explaining the principle of the present invention;

DESCRIPTION OF THE PREFERRED EMBODIMENTS

Figure 3B:
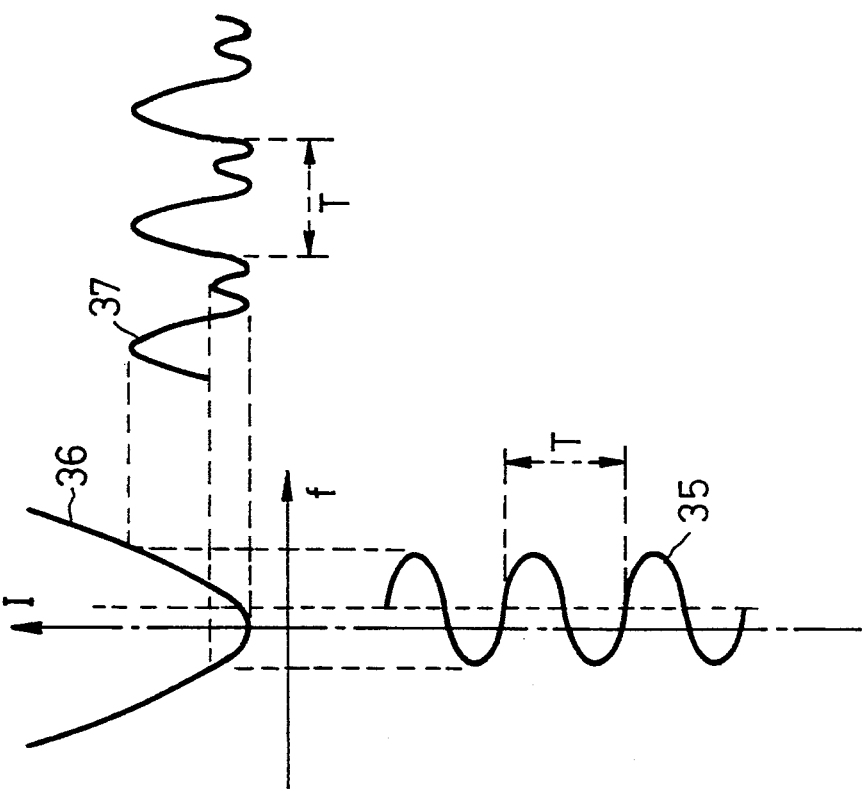
FIG. 3B is a graph showing another example of the above-said relationship in FIG. 2.
Figure 3A:
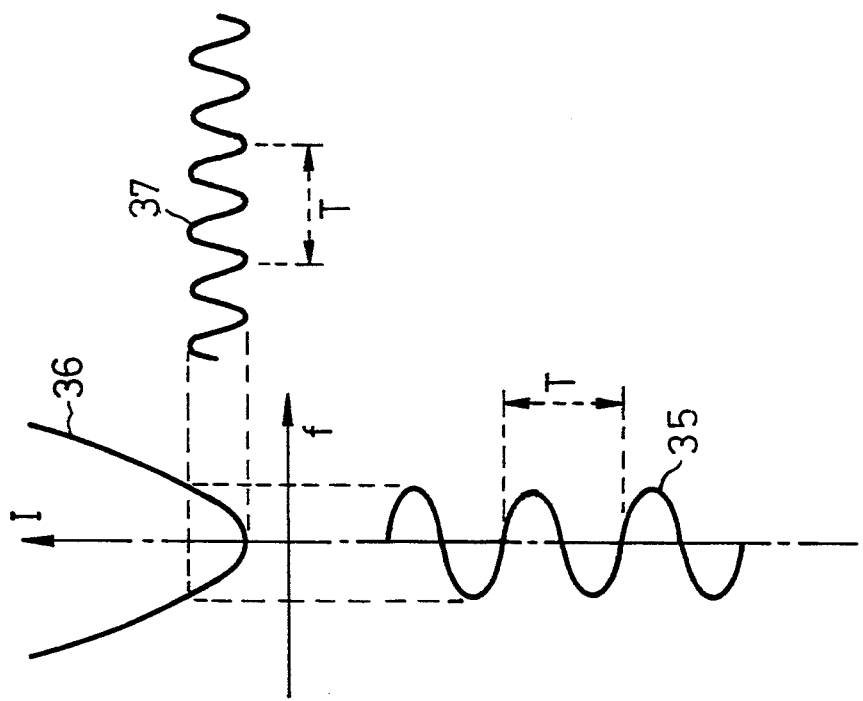
FIG. 3A is a graph showing the relationship between optical frequency variations and the intensity of light taken out of the ring resonator in FIG. 2.
Figure 4A:
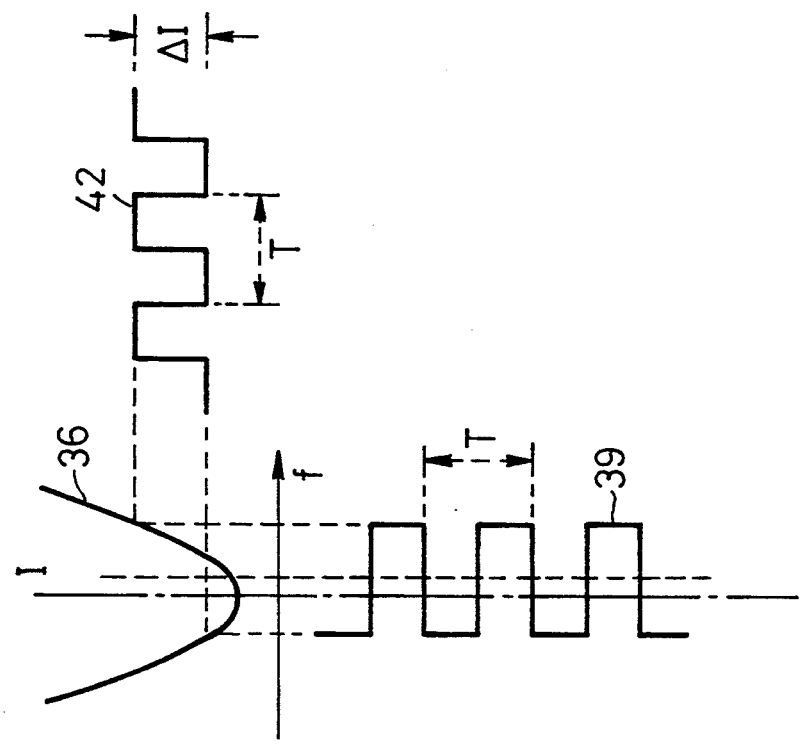
FIG. 4A is a graph showing the intensity of light taken out of the ring-shaped resonator in the case where the optical frequency undergoes variations rectangular in shape.
Figure 4B:
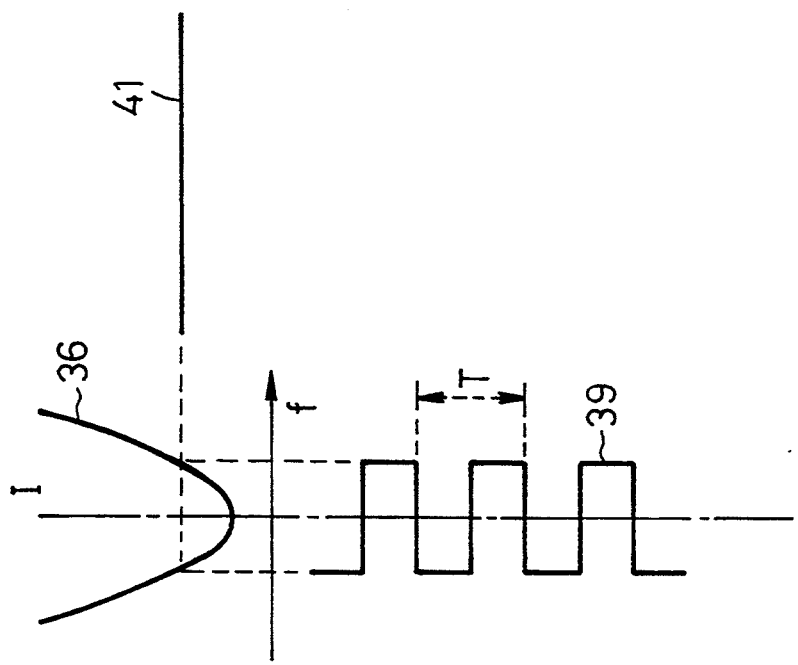
FIG. 4B is a graph showing another example of the above-said light intensity.

A description will be given first of the principle of the present invention. The present invention employs single optical frequency shift means, which is time-shared for frequency shifting both the clockwise and counterclockwise light beams which propagate through the ring-shaped optical path. That is, the single optical frequency shift means is used in common to shift the frequency of both a clockwise and counterclockwise light beam, and each of successive operation times of the frequency shift means is divided into two, one for the clockwise light beam and one for the counterclockwise light beam, so that the single frequency shift means can be used for the clockwise light beam during one divided time interval and for the counterclockwise light beam during the other divided time interval. Now, consider the frequency modulation of light by a rectangular signal of a period T as shown in FIGS. 4A and 4B, instead of frequency modulating light by a sine wave as described previously with respect to FIGS. 3A and 3B. In the case where the center of the optical frequency matches the minimum position (the resonance frequency) of one fall or drop of the reflection characteristic as indicated by the curve 39 in FIG. 4A, the intensity I of light taken out of the ring-shaped optical path takes a fixed value indicated by the line 41. When the center of the optical frequency deviates from the minimum position (the resonance frequency) of the fall or drop of the reflection characteristic as indicated by the curve 36 in FIG. 4B, the intensity of light taken out of the optical path responds to the deviation to vary in a rectangular form at the same frequency as the curve 39, as indicated by the curve 42, and the amplitude corresponds to the frequency deviation. Hence, by negative feedback control of the frequency center of light in accordance with the amplitude, the center value of the frequency of light can be locked at the resonance frequency of the ring-shaped optical path.

The present invention shifts or modulates the frequency of light by a rectangular wave as indicated by the curve 39 in FIG. 5, and one period T of the rectangular wave is split into first to fourth intervals A+, B+, A− and B−. That is, of the high-level period of the rectangular wave is used as in the illustrated embodiment, each high-level duration of the rectangular wave is divided into two intervals the first half of which is used as the first interval A+ and the latter or second half of which is used as the second interval B+, and also each low-level duration of the rectangular wave is divided into two intervals the first half of which is used as the third interval A− and the latter or second half of which is used as the fourth interval B−.

Now, let it be assumed that the resonance characteristic of the ring-shaped optical path for one of the two light beams is such as indicated by the curve 36A and the resonance characteristic for the other light beam is such as indicated by the curve 36B. In this instance, the light intensity detected output (the output from a first photodetector, for example) corresponding to the resonance characteristic 36A becomes such as indicated by the curve 42A, and the light intensity detected output (the output from a second photodetector, for example) corresponding to the resonance characteristic 36B becomes such as indicated by the curve 42B. In the present invention the light intensities corresponding to the resonance characteristic 36A in the first and third intervals A+ and A− are detected and the curve 39 for the rectangular modulation of the optical frequency in the first and third intervals A+ and A− is controlled as indicated by the broken line in such a manner that the difference between the detected light intensities is reduced to zero, Similarly, the light intensities corresponding to the resonance characteristic 36B in the second and fourth intervals B+ and B− are detected and the curve 39 for the rectangular modulation of the optical frequency in the second and fourth intervals B+ and B− is controlled as indicated by the broken line in such a manner that the difference between the detected light intensities is reduced to zero. In this way, the single optical frequency shift means is used on the time-shared basis.

Figure 2:
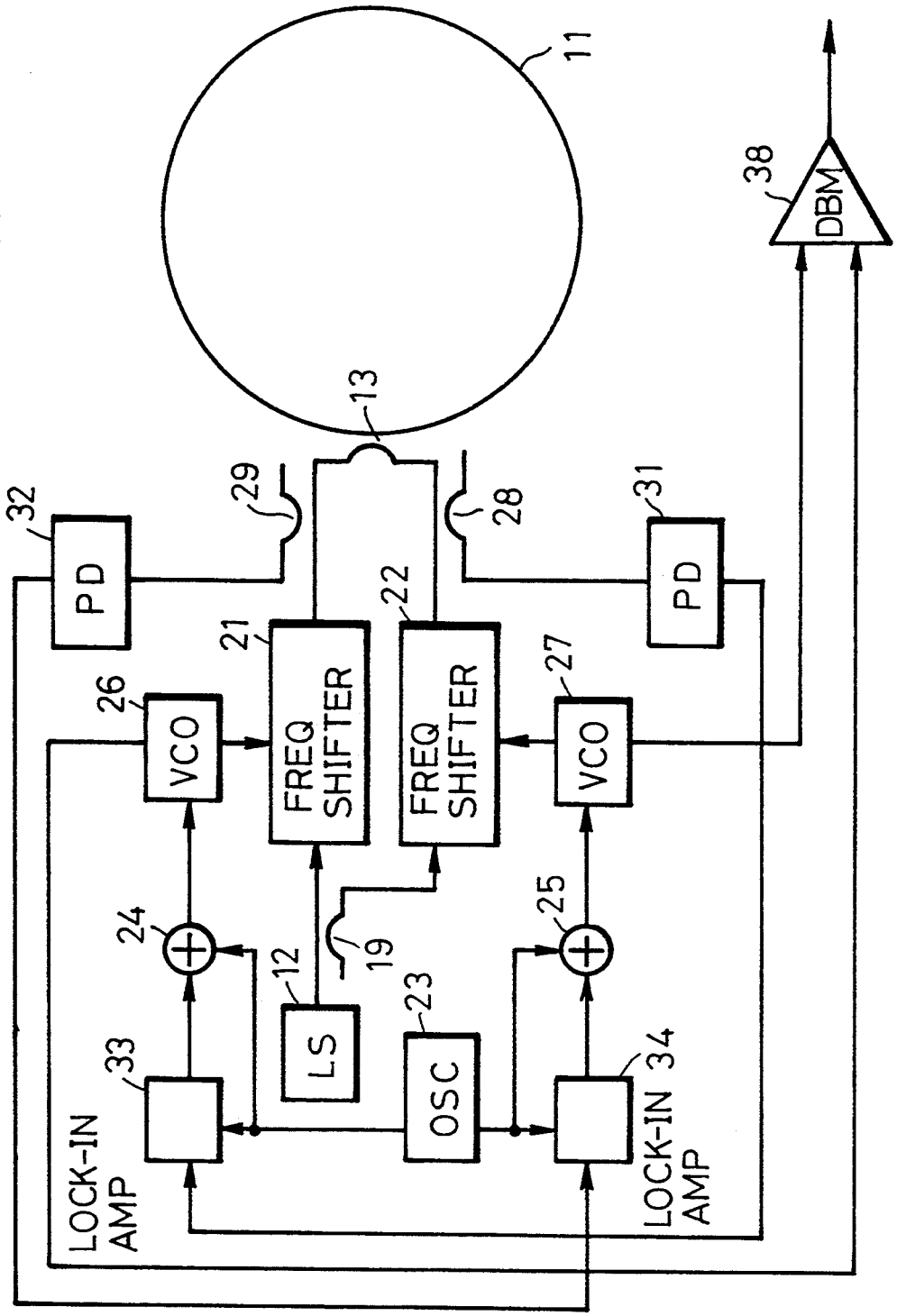
FIG. 2 is a block diagram showing a conventional optical ring resonator gyro.
Figure 6:
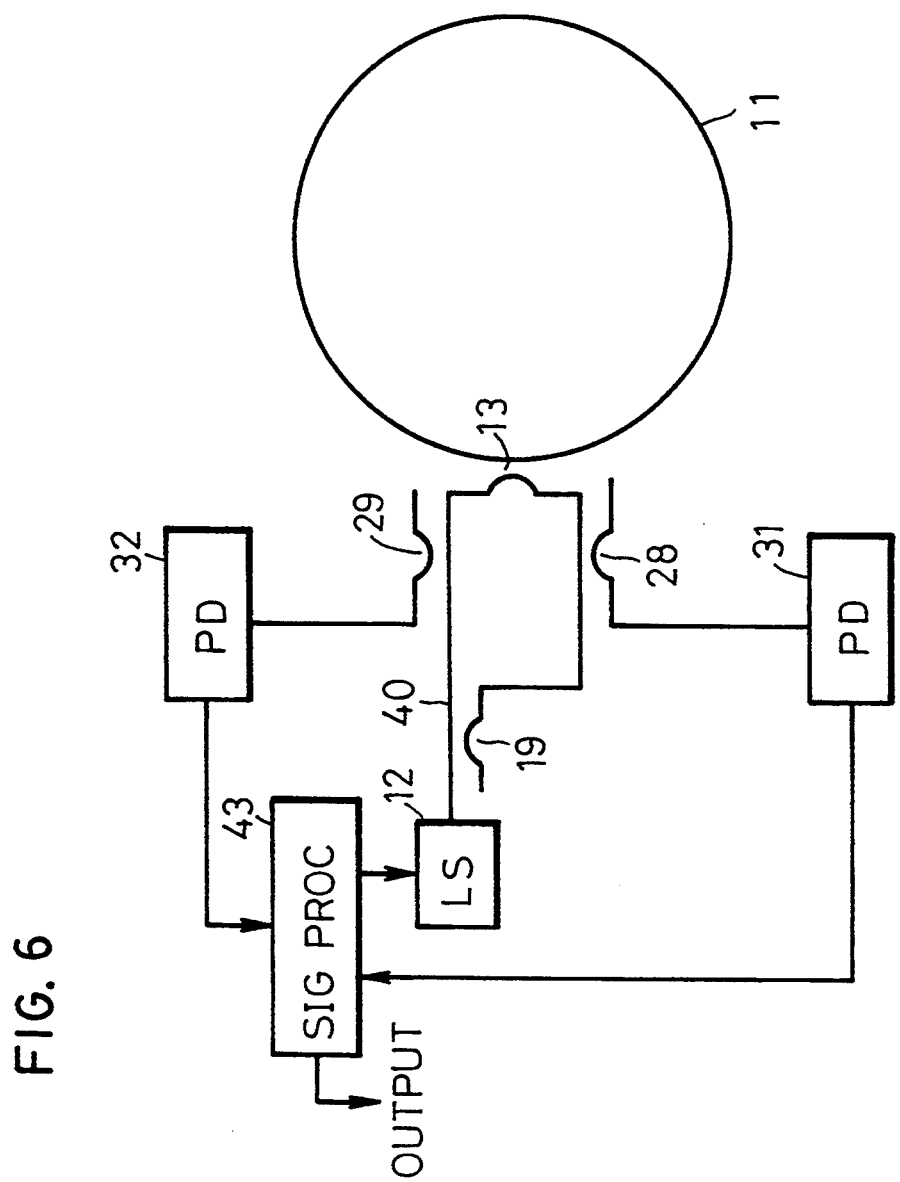
FIG. 6 is a block diagram illustrating an embodiment of the present invention.

FIG. 6 illustrates an embodiment of the present invention, in which the parts corresponding to those in FIG. 2 are identified by the same reference numerals. Light emitted from the light source 12 is provided via an optical waveguide 40 to the optical directional coupler 19, wherein it is split into two light beams, which are introduced as clockwise and counterclockwise light beams into the ring-shaped optical path 11 via the optical directional coupler 13. The two light beams, after having propagated in the ring-shaped optical path 11 in opposite directions, are led out via the optical directional coupler 13 from the ring-shaped optical path 11 and then provided via the optical directional couplers 28 and 29 to the photodetectors 31 and 32. In this case, the light beams thus led out of the ring-shaped optical path 11 are each combined with an incident light beam in the optical directional coupler 13 to form interference light, and hence it is the intensity of this interference light that is detected by each of the photodetectors 31 and 32. That is, the output light intensity for the frequency of the incident light has the same characteristic as the reflection characteristic 18 depicted in FIG. 1B.

Figure 7:
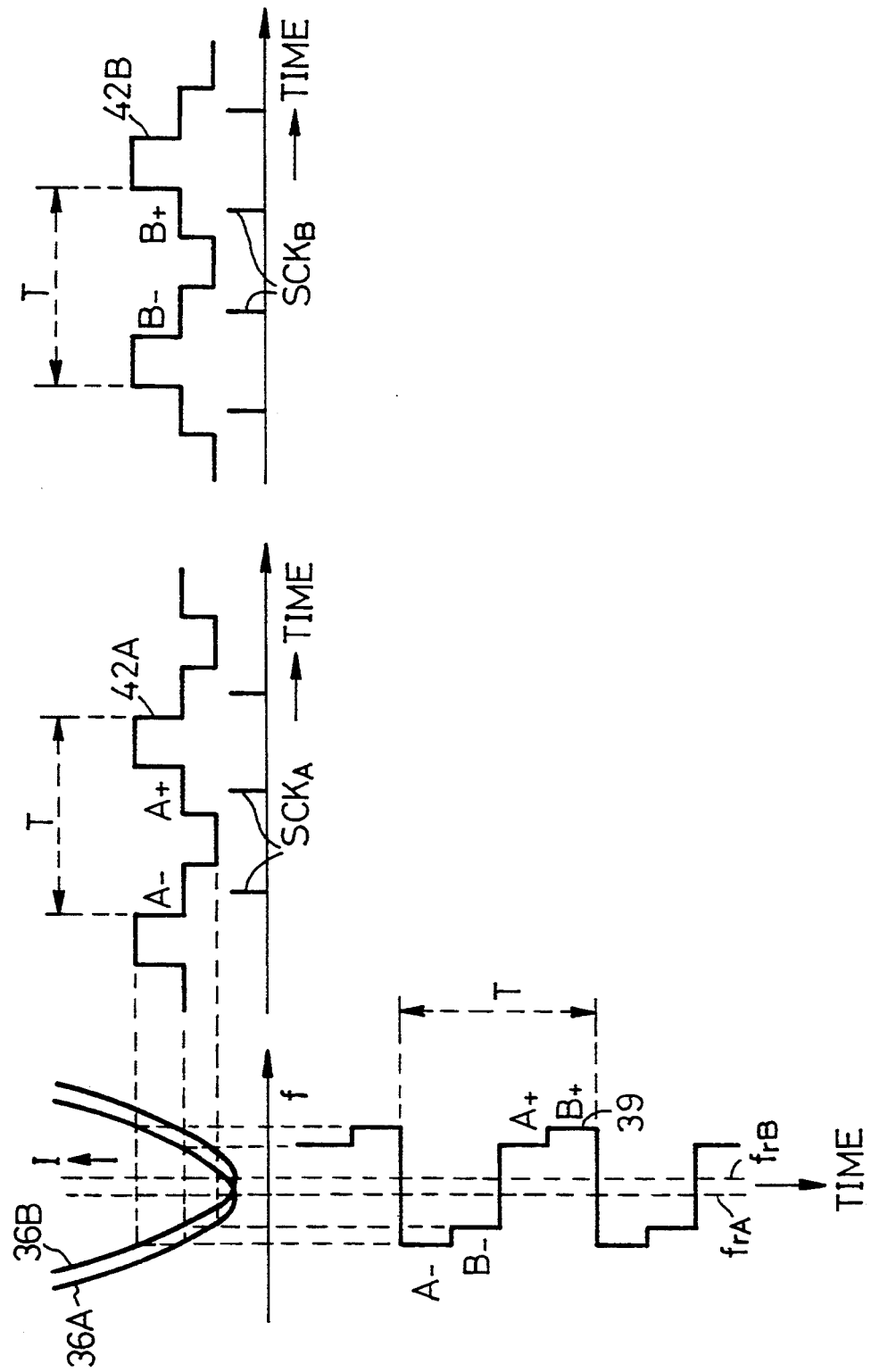
FIG. 7 is a graph showing, by way of example, the optical frequency change and the intensities of the two light beams in the present invention.

On the other hand, the light source 12 is a semiconductor laser and its characteristic that the frequency of its emitted light shifts or deviates linearly in accordance with the current injected into the laser is utilized for the optical frequency shift means. That is, the light source 12 is used also as an optical frequency shifter. Light beams which always have the same frequency are provided as the clockwise and counterclockwise light beams to the ring-shaped optical path 11. The frequency of such incident light is subjected to such a rectangular modulation as indicated by the curve 39 in FIG. 5 and the outputs from the photodetectors 3! and 32 are provided to a signal processor 43, wherein the rectangular modulation of light is controlled so that the detected levels of the photodetector 31 in the first and third intervals A+ and A− become equal to each other and the detected levels of the photodetector 32 in the second and fourth intervals B+ and B− become equal to each other. The result is, for example, as shown in FIG. 7 in which the optical resonance frequencies for the two light beams take a center value $f_{rA}$ of the curve 39 in each of the intervals A− and A+ and a center value $f_{rB}$ of the curve 39 in the intervals B− and B+, and the input angular rate is detected as the difference between the resonance points $f_{rA}$ and $f_{rB}$.

Figure 8:
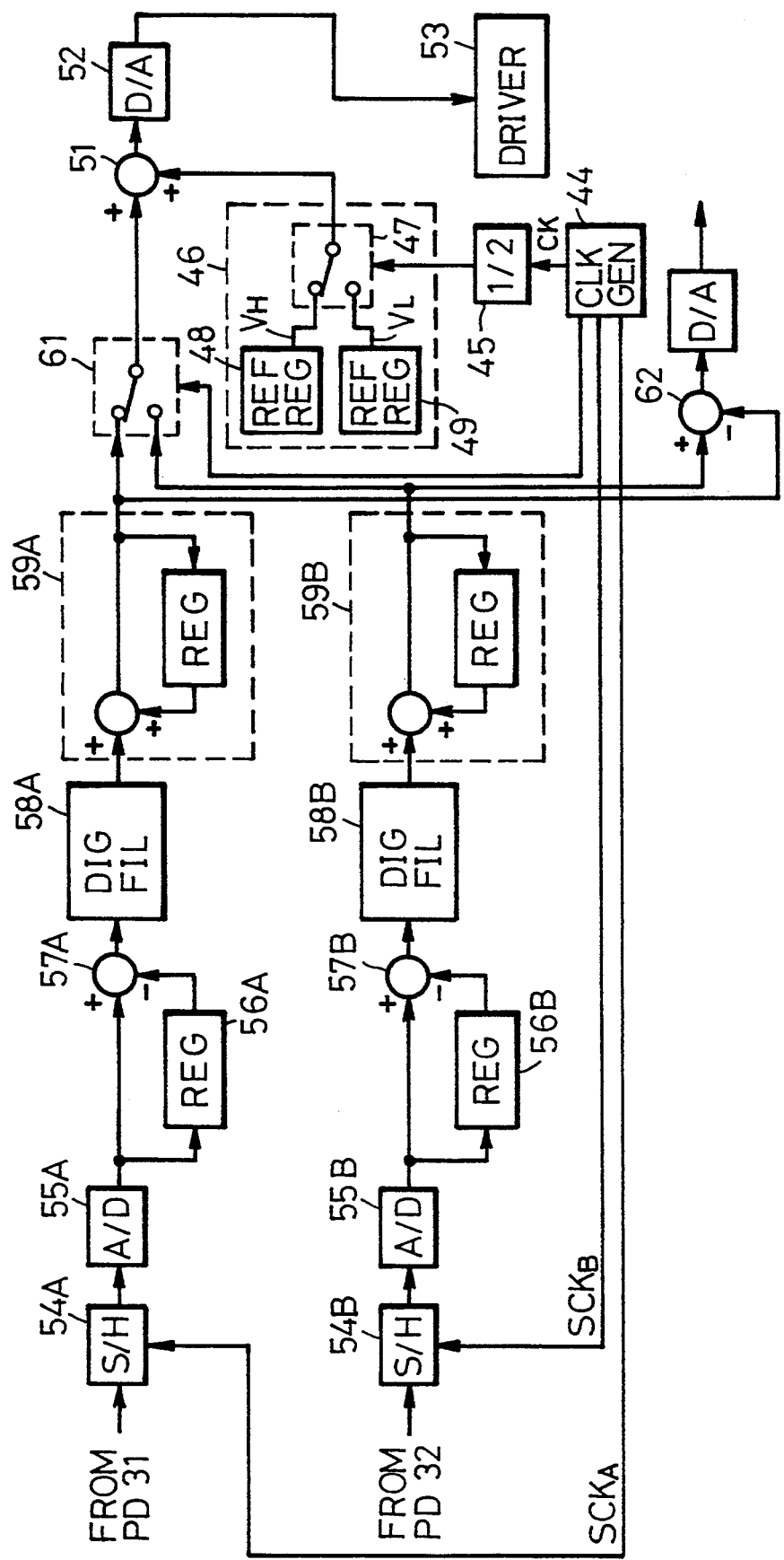
FIG. 8 is a block diagram illustrating a specific operative example of a signal processor 34 in FIG. 6.

FIG. 8 illustrates a specific operative example of the process 43. A clock CK of a period T/2, generated by a clock generator 44, is frequency divided by a frequency divider 45 down to ½. The frequency-divided output is used to control a switch 47 in a rectangular signal generating section 46, through which a high reference level $V_H$ and a low reference level $V_L$ are output from reference level registers 48 and 49 alternately with each other, thereby producing a digital rectangular signal. This digital rectangular signal is provided via an adder 51 to a D-A converter 52, wherein it is converted to an analog rectangular signal. The analog rectangular signal is applied to a driver 53, wherein it is used to control the current to be injected into a semiconductor laser diode which serves as the light source 12 in FIG. 6. The switch 47 is connected to the high reference level register 48 in the first and second intervals A+ and B+ and connected to the low reference level register 49 in the third and fourth intervals A− and B−.

A sampling pulse $SCK_A$ of the period T/2 which lies at intermediate position of each of the first and third intervals A+ and A−, generated by the clock generator 44, is applied to a sample-hold circuit 54A to sample-hold therein the output from the photodetector 31. The output from the sample-hold circuit 54A is converted by an A-D converter 55A to a digital signal, which is applied to a difference circuit 57A, wherein the difference between it and a digital signal of the immediately preceding sample period, stored in a register 56A, is detected and the digital signal is stored in the register 56A immediately prior to the next sampling. That is, the difference circuit 57A detects the difference between light intensities in the first and third intervals A+ and A−, The output from the difference circuit 57A is integrated by an integrator 59A after being applied to a digital filter 58A, if necessary, to remove noise. The output from the integrator 59A corresponds to the deviation signal which indicates the difference between the center value of the optical frequency in the first and third intervals A+ and A− and the resonance frequency $f_{rA}$ of the resonance characteristic 36A of the one light beam in the ring-shaped optical path 11.

By a sampling clock $SCK_B$ which is phased 180° apart from the sampling Clock $SCK_A$ for the sample-hold circuit 54A, the output from the photodetector 32 is sample-held in a sample-hold circuit 54B at the center of each of the second and fourth intervals B+ and B−. As is the case with the output from the sample-hold circuit 54A, the output from the sample-hold circuit 54B is processed by an A-D converter 55B, a register 56B, a difference circuit 57B, a digital filter 58B and an integrator 59B, thereby obtaining a deviation signal indicative of the difference between the center value of the optical frequency in each of the second and fourth intervals and the resonance frequency $f_{rB}$ of the resonance characteristic 36 of the other light beam in the ring-shaped optical path 11.

Figure 9:
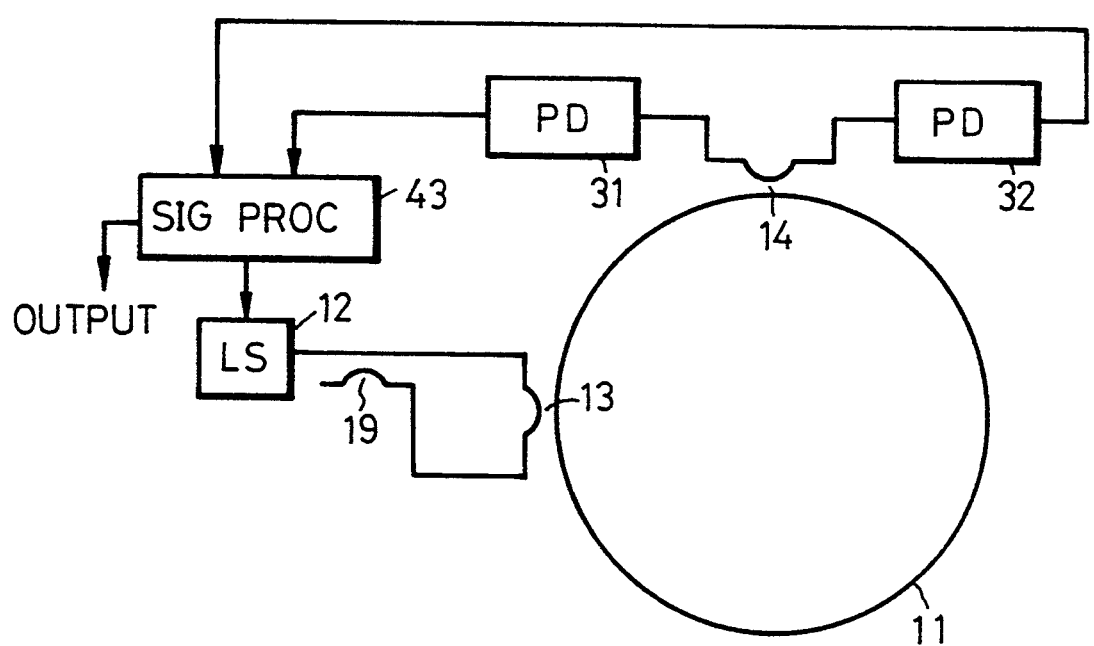
FIG. 9 is a diagram illustrating another embodiment of the present invention.

A control signal from the clock generator 44 is applied to a switch 61 to control it, through which the outputs from the integrators 59A and 59B are provided to the adder in the first and third intervals A+ and A− and in the second and fourth intervals B+ and B−, respectively. These outputs are added to the rectangular signal from the rectangular signal generator 46, and the added outputs are negatively fed back to control the optical frequency to bring the resonance frequencies of the two light beams in the ring-shaped optical path 11 into agreement with the center values of the optical frequency in the first and third intervals A+ and A− and the center values of the optical frequency in the second and fourth intervals B+ and B−. The difference between the outputs from the integrators 59A and 59B is detected by a difference circuit 62, and if necessary, it is converted by a D-A converter 63 to an analog signal for detecting the input angular rate. In FIG. 8, the processing from the A-D converters 55A and 55B to the state preceding the D-A converter 52 may be performed by a microcomputer. It is also possible to omit the sample-hold circuits 54A and 54B, in which case the output from the photodetector 31 (32) is applied directly to the A-D converter 55A (55B)in the, intervals A+ and A− (B+ and B−), FIG. 9 illustrates another embodiment of the present invention, wherein the optical directional coupler 14 is connected to the ring-shaped optical path 11, in addition to the light introducing optical directional coupler 13, and the two light beams are taken out therefrom via the coupler 14 and provided to the photodetectors 31 and 32. In this instance, the transmission characteristic 16 shown in FIG. 1A will be utilized. While in the above embodiment the optical frequency control corresponding to the resonance of the clockwise light beam and the optical frequency control corresponding to the resonance of the counterclockwise light beam are effected alternately with each other, it is also possible to employ a method, in which the optical frequency control for the resonance of the clockwise light beam is effected for the high frequency in the intervals A+ and for the low frequency in the interval A− and the optical frequency control for the resonance of the counterclockwise light beam is effected for the high frequency in the interval B+ and for the low frequency in the interval B−. That is, the intervals A+, A−, B+, B− constitute one cycle in that order and the optical frequency shift means is time-shared for the respective light beams.

As described above, according to the present invention, single optical frequency shift means is controlled, on a time-shared basis, so that the center values of the frequencies of the two light beams in the ring-shaped optical path resonate with each other and the photodetector output for the corresponding time is taken out and processed, and hence there is no need of using two or more optical frequency shift means. This permits simplification of the entire construction of the optical ring resonator gyro. In the case where a semiconductor laser is used as the light source and the optical frequency shift is performed by controlling the current to be injected into the laser, the optical system can be formed using only the ring-shaped optical path as the principal part, and hence the optical ring resonator gyro can be made particularly small in size.

It will be apparent that many modifications and variations may be effected without departing from the scope of the novel concepts of the present invention.

What is claimed is:

1. An optical ring resonator gyro comprising:
a light source for supplying coherent light;
optical frequency shift means for shifting the frequency of said coherent light in accordance with an input signal;
rectangular signal generator means for providing a rectangular signal to said optical frequency shift means as an input signal for shifting the frequency of said coherent light;
a ring-shaped optical path surrounding a limited closed area and permitting light to propagate therethrough a plurality of time;
optical coupler means for introducing said coherent light, shifted in frequency by said optical frequency shift means, into said ring-shaped optical path so as to propagate therethrough in opposite directions as a clockwise light beam and a counterclockwise light beam;
first and second photodetectors for detecting the intensities of interference light beams available from said optical coupler means and produced at said optical coupler means by interference of respective portions of said clockwise and counterclockwise light beams which have propagated in opposite directions in said optical path and interfered with each other;
means for dividing each period of said rectangular signal generated by said rectangular signal generator means into four intervals by dividing a high-level duration of each period thereof into first half and latter half intervals and dividing a low-level duration of each period thereof into first half and the latter half intervals, respectively;
first deviation signal detector means responsive to outputs of said first photodetector during said first half intervals of the high-level and the low-level durations of each period of said rectangular signal, respectively, and for detecting as a first deviation signal the difference between said outputs of said first photodetector during said first half intervals;
second deviation signal detector means responsive to outputs of said second photodetector during said latter half intervals of the high-level and the low-level durations of each period of said rectangular signal, respectively, and for detecting as a second deviation signal the difference between said outputs of said second photodetector during said latter half intervals;
switching means for negatively feeding back said first deviation signal to said optical frequency shift means so as to reduce to zero said difference between the outputs of said first photodetector during said first half intervals of the high-level and the low-level durations of each period of said rectangular signal and for negatively feeding back said second deviation signal to said optical frequency shift means so as to reduce to zero said difference between the outputs of said second photodetector during said latter half intervals of the high-level and the low-level durations of each period of said rectangular signal; and
output means for detecting the difference between said first and second deviation signals and for outputting said deviation signal difference as an angular rate input into said ring-shaped optical path.

2. An optical ring resonator gyro comprising:
a light source for supplying coherent light;
optical frequency shift means for shifting the frequency of said coherent light in accordance with an input signal;
rectangular signal generator means for providing a rectangular signal to said optical frequency shift means as an input signal for shifting the frequency of said coherent light;
a ring-shaped optical path surrounding a limited closed area and permitting light to propagate therethrough a plurality of time;
first optical coupler means for introducing said coherent light, shifted in frequency by said optical frequency shift means, into said ring-shaped optical path so as to propagate therethrough in opposite directions as a clockwise light beam and a counterclockwise light beam;
second optical coupler means for taking out respective portions of both said light beams that have propagated through said ring-shaped optical path in opposite directions a plurality of times and have interfered with each other a plurality of times, respectively;
first and second photodetectors for detecting the intensities of said light beam portions taken out by said second optical coupler means;
means for dividing each period of said rectangular signal generated by said rectangular signal generator means into four intervals by dividing a high-level duration of each period thereof into first half and the latter half intervals and dividing a low-level duration of each period thereof into first half and the latter half intervals, respectively;
first deviation signal detector means responsive to outputs of said first photodetector during said first half intervals of the high-level and the low-level durations of each period of said rectangular signal, respectively, and detecting as a first deviation signal the difference between said outputs of said first photodetector during said first half intervals;
second deviation signal detector means responsive to outputs of said second photodetector during said latter half intervals of the high-level and the low-level durations of each period of said rectangular signal, respectively, and detecting as a second deviation signal the difference between said outputs of said second photodetector during said latter half intervals;

switching means for negatively feeding back said first deviation signal to said optical frequency shift means so as to reduce to zero said difference between the outputs of said first photodetector during said first half intervals of the high-level and the low-level durations of each period of said rectangular signal and for negatively feeding back said second deviation signal to said optical frequency shift means so as to reduce to zero said difference between the outputs of said second photodetector during said latter half intervals of the high-level and the low-level durations of each period of said rectangular signal; and output means for detecting the difference between said first and second deviation signals and outputting said deviation signal difference as an angular rate input into said ring-shaped optical path.

3. The optical ring resonator gyro of claim 1 or 2 wherein said light source is a semiconductor laser and said optical frequency shift means controls the current injected into said semiconductor laser to shift the frequency of light emitted from said semiconductor laser.

4. The optical ring resonator gyro of claim 1 or 2 wherein said ring-shaped optical path is an optical waveguide formed of glass or optical crystal.

* * * * *